(12) United States Patent
Mayer et al.

(10) Patent No.: US 7,458,432 B2
(45) Date of Patent: Dec. 2, 2008

(54) DUAL LEVER STEERING CONTROL MECHANISM

(75) Inventors: Benjamin S. Mayer, West Bend, WI (US); Kyle Thomas Ressler, West Bend, WI (US)

(73) Assignee: Deere & Company, Moline, IL (US)

( * ) Notice: Subject to any disclaimer, the term of this patent is extended or adjusted under 35 U.S.C. 154(b) by 377 days.

(21) Appl. No.: 11/454,774

(22) Filed: Jun. 16, 2006

(65) Prior Publication Data

US 2007/0289785 A1 Dec. 20, 2007

(51) Int. Cl.
*B62D 11/24* (2006.01)

(52) U.S. Cl. .................. 180/6.32; 56/10.8; 56/11.3; 74/473.12; 74/473.24

(58) Field of Classification Search ............... 180/6.32, 180/6.34, 6.36, 6.38, 6.4; 74/473.12, 473.24, 74/523, 522, 522.5, 525; 56/10.8, 11.3
See application file for complete search history.

(56) References Cited

U.S. PATENT DOCUMENTS

| 4,395,865 | A | 8/1983 | Davis, Jr. et al. ............. 56/13.3 |
|---|---|---|---|
| 4,470,243 | A | 9/1984 | Rayfield |
| 4,799,397 | A * | 1/1989 | Egidi et al. ............... 74/473.33 |
| 5,644,903 | A | 7/1997 | Davis |
| 6,161,637 | A | 12/2000 | Decker et al. .............. 180/6.48 |
| 6,240,802 | B1 * | 6/2001 | Miller .......................... 74/523 |
| 6,301,864 | B1 * | 10/2001 | Damie et al. ................. 56/11.3 |
| 6,434,917 | B1 | 8/2002 | Bartel |
| 6,499,205 | B1 * | 12/2002 | Laffan ........................ 29/401.1 |
| 6,581,704 | B2 * | 6/2003 | Law et al. .................. 180/6.32 |
| 6,647,821 | B2 * | 11/2003 | Ruckert et al. ............. 74/473.3 |
| 6,709,013 | B2 * | 3/2004 | Renfroe et al. .............. 280/778 |
| 6,857,335 | B2 * | 2/2005 | Kahara .................... 74/473.33 |
| 7,299,610 | B2 * | 11/2007 | Piontek ....................... 56/11.3 |

* cited by examiner

*Primary Examiner*—Tony H. Winner

(57) ABSTRACT

A dual lever steering control mechanism for a mounting a control lever or stick to a mower is disclosed. The mechanism includes a housing with an opening, a forward/reverse lever insertable through the opening and pivoting on a first axis, and a neutral position lever pivotably attached to the forward/reverse lever to pivot on a second axis transverse to the first axis. The control lever may be attached to the neutral position lever at a plurality of different height and fore/aft settings.

20 Claims, 4 Drawing Sheets

DUAL LEVER STEERING CONTROL MECHANISM

FIELD OF THE INVENTION

This invention relates to grass mowing machines, and specifically to zero turning radius (ZTR) mowing machines having independently powered left and right drive wheels controlled by a pair of control levers or sticks.

BACKGROUND OF THE INVENTION

Grass mowing machines known as ZTR mowers have at least one independently powered drive wheel on each side of a frame. One drive wheel may be operated in a forward direction while the other drive wheel may be stopped or operated in reverse. Many ZTR mowers have a twin stick control system. A pair of control levers or sticks may be provided side-by-side, with each lever or stick controlling one of the drive wheels. When both levers or sticks are advanced together forwardly out of their neutral position, both drive wheels rotate forwardly to cause the mower to move forward. A ZTR mower may be steered by advancing one lever or stick more than the other.

Typically, each control lever or stick on a ZTR mower may be linked to a pump arm of one of two separate hydraulic pumps, or of a dual hydraulic pump; i.e, a separate pump for each wheel. The lever or stick may be used to move a pump swashplate through a direct linkage.

The control levers or sticks on a ZTR mower may be mounted on the vehicle frame so that each has a first pivot axis allowing the lever or stick in the operating position to pivot forwardly in an arc to turn the wheel in forward, or pivot rearwardly to turn the wheel in reverse. Additionally, each lever or stick may pivot outwardly in an arc from the operating position to a non-operating or parked position. Some levers or sticks may pivot outwardly to activate a safety switch which can deactivate the PTO and/or cutting blades, to enhance safety of an operator who is exiting or entering the operator seat or platform.

In the past, the left and right hand control levers or sticks were mounted on a ZTR mower with separate left and right control mechanisms to allow pivoting of the levers. The pivot mechanisms typically were made from sheet steel, rod and tubing, and included a bracket to mount a plunger-type safety switch near the part on the lever that activates the plunger on the switch. Additionally, the control levers or sticks could not be readily sized or mounted to optimize operator comfort. For example, ZTR mowers did not allow adjustment of the height of the control levers and the position of the levers relative to the operator seat or platform.

There is a need for a light weight, inexpensive, dual lever steering control mechanism for mounting control levers or sticks on ZTR mowers. There is a need for a dual lever steering control mechanism that can be used interchangeably to mount either the left or right control levers or sticks to a ZTR mower. There is a need for a dual lever steering control mechanism having a minimum number of parts and components to simplify manufacturing and assembly. There is a need for a dual lever steering control mechanism that can allow the levers to be safely and securely adjusted up/down and fore/aft for optimal operator comfort.

SUMMARY OF THE INVENTION

A dual lever steering control mechanism is provided for mounting control levers or sticks to a ZTR mower. The dual lever steering control mechanism may be used interchangeably to mount either the left hand or right hand control lever or stick, and includes only four cast parts. The mechanism allows adjustment of the lever or stick to change its height setting and position relative to the operator seat or platform, to optimize operator comfort.

DESCRIPTION OF THE PREFERRED EMBODIMENT

The present invention may be used with a ZTR mower having at least one drive wheel on each side that is independently powered so that it may rotate independently of the other drive wheel. Each independent drive may include a separate hydrostatic drive motor coupled to each wheel. The pair of drive motors may be connected via hydraulic conduits to a dual hydrostatic pump; i.e, a separate pump for each wheel. Each side of the dual hydrostatic pump may have a swashplate that may define a pump stroke between a neutral position and a full forward position.

Figure 1:
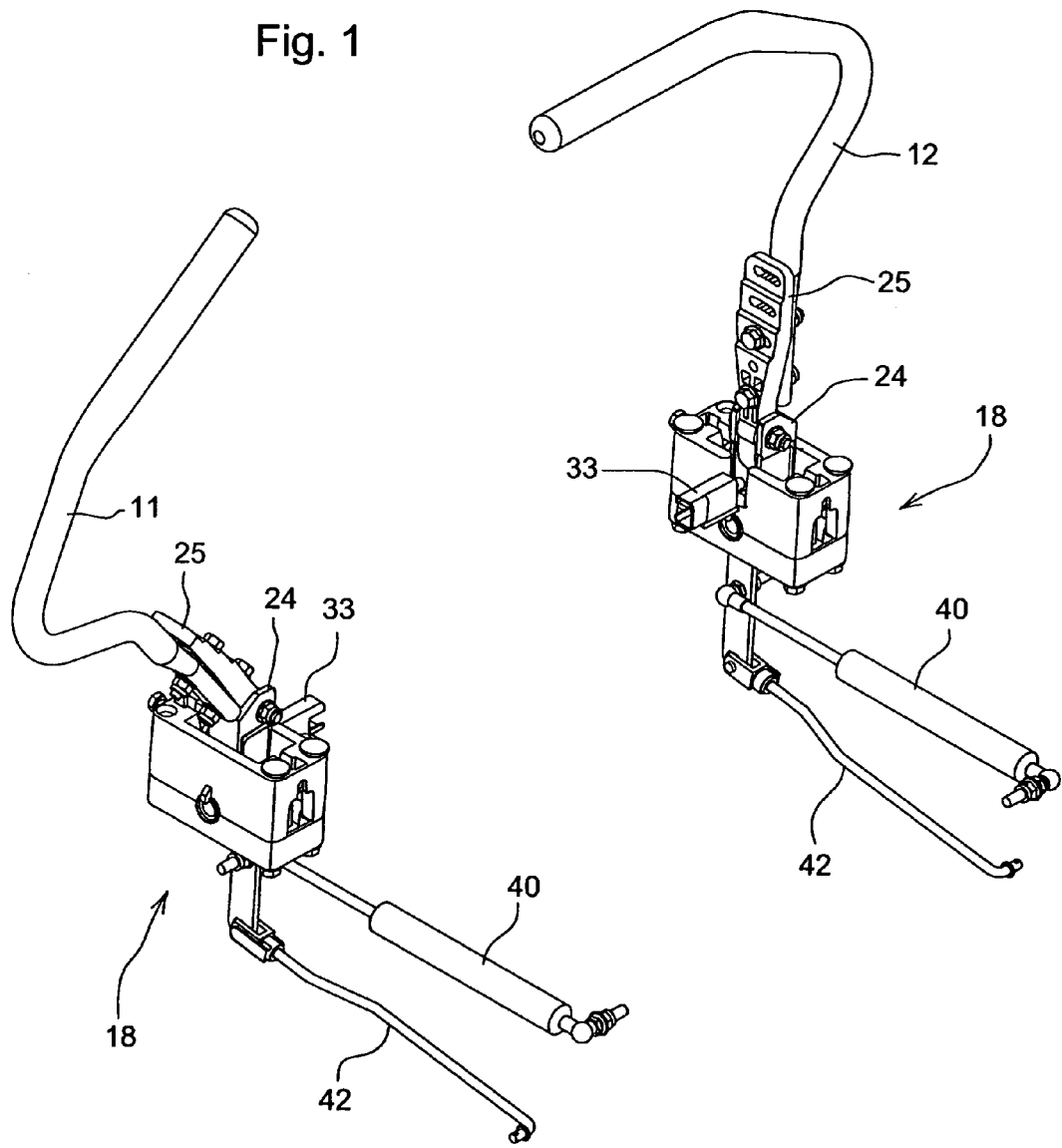
FIG. 1 is a perspective view of a pair of dual lever steering control mechanisms for a ZTR mower according to a first embodiment of the invention.

In a first embodiment shown in FIG. 1, left and right motion control levers or sticks 11, 12 may be used to operate a ZTR mower. Each control lever or stick may be mounted to the mower so that the lever may pivot forwardly to move a swashplate in a hydrostatic pump in a first direction to cause a drive wheel to rotate forward, or pivot rearwardly to move the swashplate in a second direction to cause the drive wheel to rotate backward. Each control lever or stick may have a neutral position in which the corresponding drive wheel is at rest. The pair of control levers or sticks may be mounted in front of an operator's seat or platform on a ZTR mower.

In one embodiment, the lower ends of each control lever or stick 11, 12 may be mounted to the frame of the ZTR mower using dual lever steering control mechanism 18. The same dual lever steering control mechanism may be used to mount either the left hand or right hand control lever or stick. In the mounted position, each control lever or stick may move independently of the other. For example, in FIG. 1, left control lever or stick 11 is shown in the parked position, and right control lever or stick 12 is shown in the neutral position.

Figure 2:
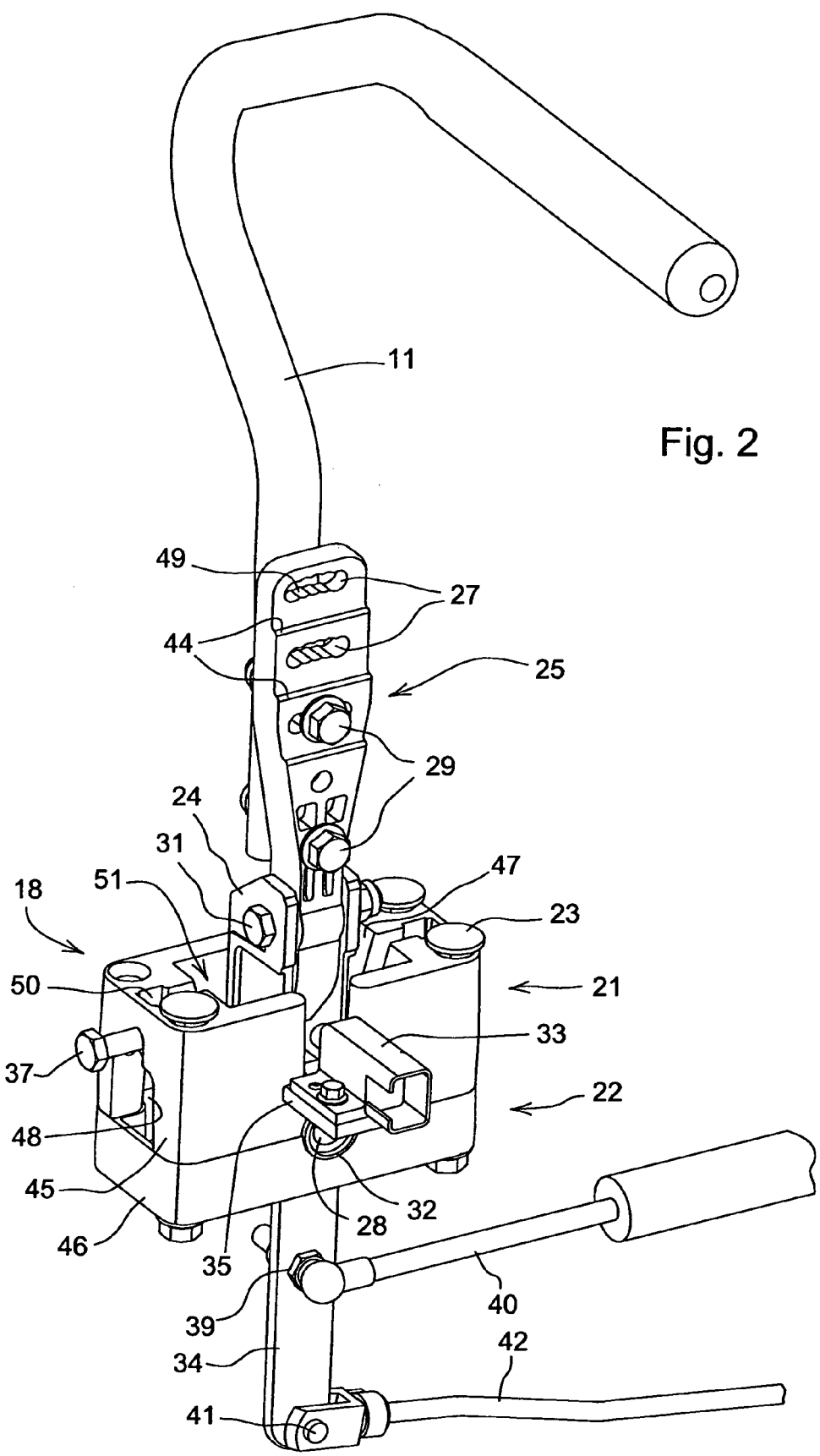
FIG. 2 is a perspective view of a dual lever steering control mechanism in a neutral position according to a first embodiment.

In FIG. 2, dual lever steering control mechanism 18 is shown in the neutral position. The dual lever steering control mechanism may include upper housing 21, lower housing 22, forward/reverse lever 24, and neutral position lever 25. The upper and lower housings may be metal components that can be fastened together with bolts 23 at or near the outer walls 45, 46 of the upper and lower housings. In one embodiment, the upper and lower housings may be cast zinc. The upper and lower housings of each dual lever steering control mechanism may include inner walls 47, 48 respectively. The upper and lower housing members may include one or more hollow portions between their outer walls and inner walls. The inner walls may define an opening 51 dimensioned to receive the forward/reverse lever 24 and neutral position lever 25.

Figure 3:
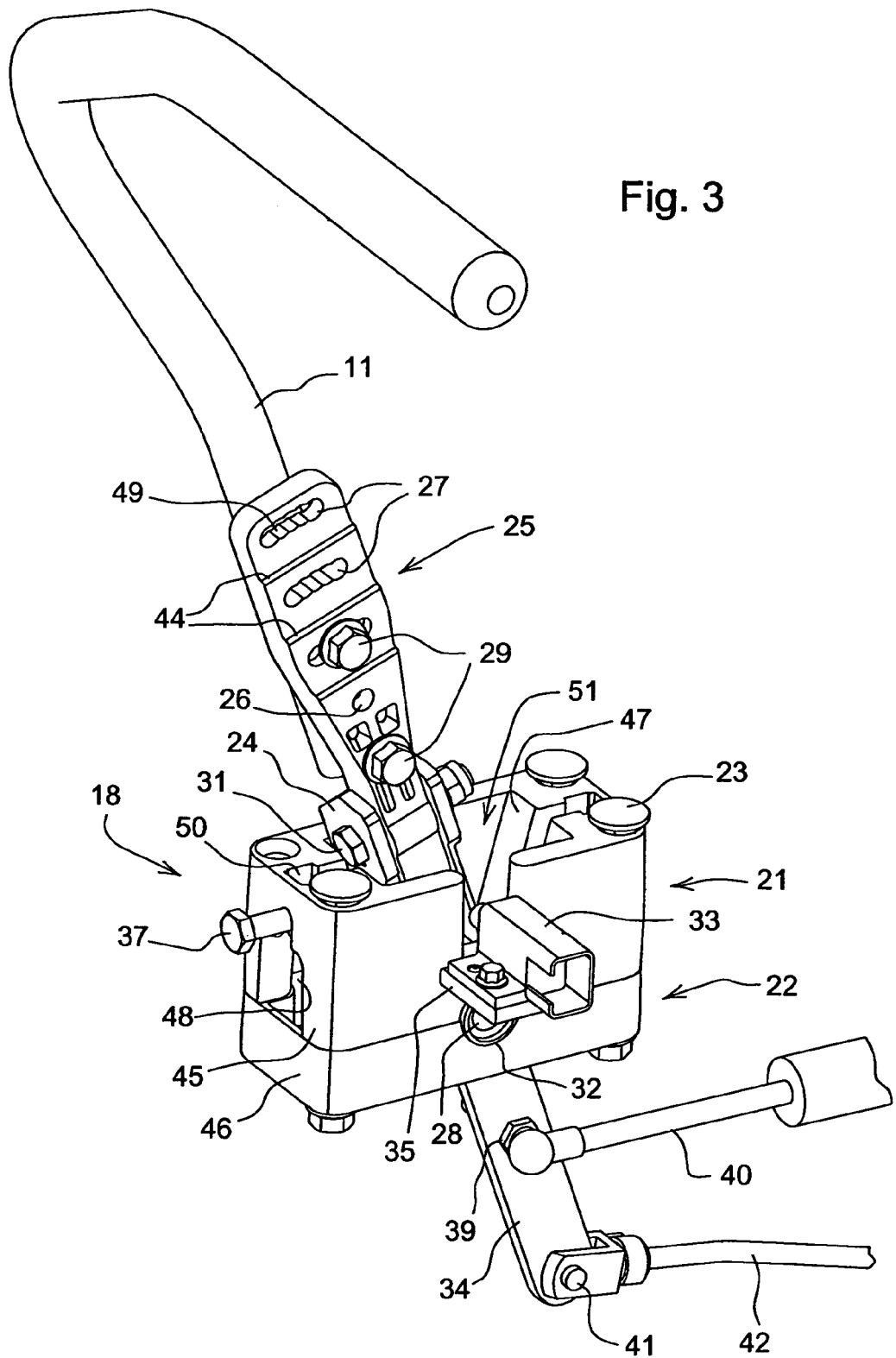
FIG. 3 is a perspective view of a dual lever steering control mechanism in a full forward position according to a first embodiment.

Now referring to FIG. 3, the dual lever steering control mechanism is shown in the forward position according to one embodiment. The inner wall 47 of the upper housing facing the front and rear of the housing may be sloped at an angle that defines and provides a stop for the maximum forward and reverse positions, and maximum pivot angles of forward/reverse lever 24. For example, the slope of the inner walls of the upper housing may be between about 5 degrees and about 30 degrees from vertical.

In one embodiment, the upper housing also may include an landing or shelf 35 on which neutral position switch 33 may be mounted. The landing or shelf 35 may be integral with the housing and preferably extends outwardly from the outer wall of the upper housing under slot 38.

In one embodiment, forward/reverse lever 24 may be inserted and positioned in opening 51. The forward/reverse lever may include a pair of cylindrical projections 28 near or adjacent the midpoint of the lever. The cylindrical projections may be pivotably mounted in collar 32 between the upper and lower housings. The cylindrical projections define a first, generally horizontal pivot axis on which the forward/reverse lever can pivot fore and aft.

In FIG. 3, the dual lever steering control mechanism is shown with forward/reverse lever 24 pivoted forward on the first axis to turn the corresponding wheel in the forward direction. The forward/reverse lever also may be pivoted back to rotate the wheel in the reverse direction.

In one embodiment, the front of the upper housing may include a trough 50 for full speed tracking adjustment bolt 37. The full speed tracking adjustment bolt can provide a stop to limit forward pivoting of the forward/reverse lever, thereby providing an adjustable maximum or limit to the forward speed of the mower. The full speed tracking adjustment bolt may pass through the upper housing and be threaded to a nut captured in the upper housing. The maximum forward speed of the mower may be adjusted by turning the full speed tracking adjustment bolt to vary the penetration of the bolt through the sloped inner wall of the upper housing.

In one embodiment, the lower part 34 of the forward/reverse lever, below the pair of cylindrical projections, may be connected at pivot joint 39 to damper 40, and at pivot joint 41 to transmission control rod 42. The transmission control rod may be linked to a swash plate on a hydrostatic transmission pump.

In one embodiment, the upper part of the forward/reverse lever, above the pair of cylindrical projections, may include a pair of holes through which a rod or bolt 31 may be inserted to provide a second pivot axis 31 transverse to the first pivot axis. For example, the second pivot axis may be generally horizontal. In one embodiment, the forward/reverse lever may be cast zinc, and may include one or more hollow portions.

In one embodiment, neutral position lever 25 may be pivotably connected to the forward/reverse lever by bolt or rod 31 located at the second pivot axis. The neutral position lever may have a hole through a lower part thereof, and bolt or rod 31 may be inserted through the hole and the corresponding holes in the forward/reverse lever.

Figure 4:
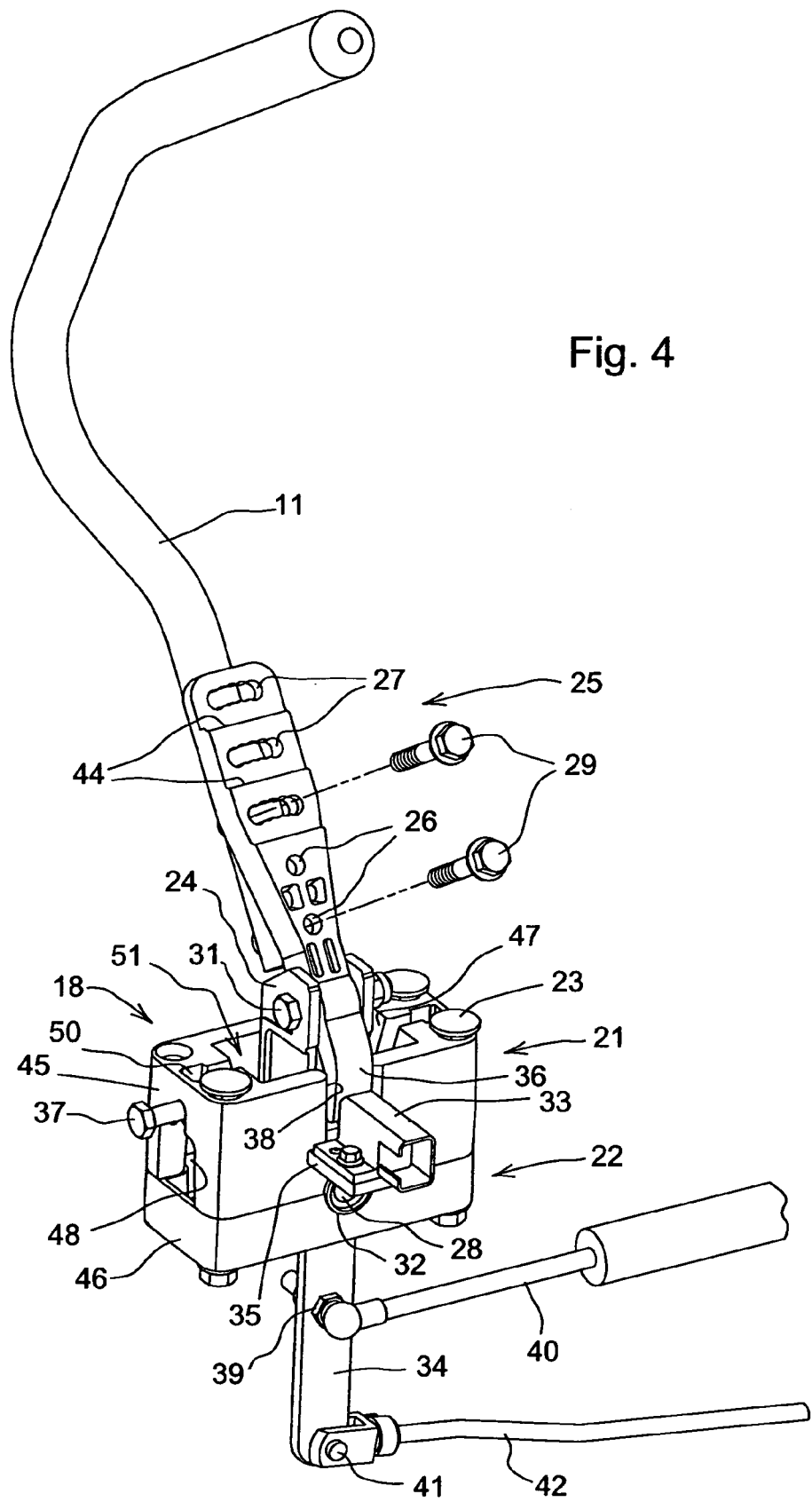
FIG. 4 is a perspective view of a dual lever steering control mechanism in a parked position according to a first embodiment.

In one embodiment, as shown in FIG. 4, the operator can pivot the control lever or stick outwardly to a parked position. This can be done only if the forward/reverse lever is at the neutral position. Pivoting the control lever or stick outwardly causes neutral position lever 25 to pivot on the second pivot axis, so that its lower part enters slot 38 in the upper housing. After the lower part of the neutral position lever enters slot 38, it can contact and actuate safety switch 33. The lever and neutral position lever may pivot between about 20 degrees and about 45 degrees to the full outward or parked position. The lower end of the neutral position lever may be sloped at the same or similar angle of between about 20 degrees and 45 degrees from vertical, and may assure full contact with the safety switch in the full outward position. The neutral position lever may be cast zinc.

In one embodiment, each control lever or stick may be attached and secured to a neutral position lever in any of or a plurality of different settings. The different settings of the control lever or stick on the neutral position lever can accommodate different operators, arm lengths, seat positions, and operating conditions.

In one embodiment, each control lever or stick can be attached to the neutral position lever at two or more different height settings. Different height settings can help accommodate operators of different sizes and arm lengths. To provide different height settings, the lower part of the neutral position lever has a plurality of upper slots 27 and lower holes 26. For example, there may be three upper slots 27 spaced about one inch from the slot above or below it. The control lever or stick may be attached to the neutral position lever by inserting attachment bolts 29 through the selected holes and slots. A pair of attachment bolts 29 may attach the control lever or stick to the neutral position lever, one of the bolts through a lower hole, and one of the bolts through an upper slot.

In one embodiment, a control lever or stick can be attached to the neutral position lever at two or more different fore and aft settings with respect to the operator seat or platform. As a result, the proximity of the levers or sticks to the operator (in the neutral position, and in the forward and reverse positions) can be adjusted to a different setting to accommodate different operators and their ergonomic needs, and to maximize operator comfort and performance. Each of the upper slots in the neutral position lever may be about one inch in length, and may have the shape of an arc with one of holes 26 as its hypothetical center point. Each slot may be separated by a ledge 44. Detents or ridges 49 in each of the upper slots may help hold an attachment bolt securely in a desired setting. The detents or ridges may prevent the attachment bolt, once tightened, from shifting fore or aft within the slot.

In one embodiment, to attach a control lever or stick to the neutral position lever, the forward/reverse lever may be moved to the neutral position. An attachment bolt may be inserted through the lever and a selected hole 26. The lever then may be placed in a desired fore/aft setting with respect to the operator seat or platform, and the desired height. A second attachment bolt may be inserted through the lever and the selected upper slot 27, and the attachment bolts may be tightened.

Having described the preferred embodiment, it will become apparent that various modifications can be made without departing from the scope of the invention as defined in the accompanying claims.

The invention claimed is:

1. A dual lever steering control mechanism for a mounting a control lever to a mower comprising:

an upper housing having an outer wall and inner wall;

a lower housing removably attached to the upper housing and having an outer wall and an inner wall;

the inner walls of the upper and lower housings providing an opening;

a forward/reverse lever insertable through the opening and pivoting on a first axis;

a neutral position lever pivotably attached to the forward/reverse lever to pivot on a second axis transverse to the first axis; and the control lever attached to the neutral position lever.

2. The dual lever steering control mechanism of claim 1 wherein the control lever may be attached to the neutral position lever at a plurality of different height and fore/aft settings.

3. The dual lever steering control mechanism of claim 2 wherein the neutral position lever has at least one slot to which the control lever may be attached in a plurality of fore/aft settings.

4. The dual lever steering control of claim 2 wherein the neutral position lever has a plurality of slots to which the control lever may be attached in a plurality of height settings.

5. The dual lever steering control mechanism of claim 1 further comprising a neutral position switch activated by pivoting the neutral position lever outwardly.

6. The dual lever steering control mechanism of claim 1 further comprising a full speed tracking adjustment bolt in the lower housing to provide an adjustable stop for limiting the pivoting of the forward/reverse lever on the first axis.

7. The dual lever steering control mechanism of claim 1 wherein the upper housing, lower housing, forward/reverse lever and neutral position lever are cast metal.

8. A dual lever steering control mechanism for mounting a control lever to a mower, comprising:
 - a two-part housing with an opening therethrough;
 - a forward/reverse lever inserted and extending through the opening and having a first pivot axis in the housing to pivot between a forward position and a reverse position, with a neutral position therebetween;
 - a neutral position lever pivoting on a second pivot axis with respect to the forward reverse lever, the control lever attached to the neutral position lever, the neutral position lever pivoting outwardly on the second pivot axis only if the forward/reverse lever is in the neutral position; and
 - a safety switch positioned on the housing and actuatable if the neutral position lever pivots outwardly.

9. The dual lever steering control mechanism of claim 8 wherein the neutral position lever provides a plurality of attachment height settings for attaching the control lever.

10. The dual lever steering control mechanism of claim 8 wherein the neutral position lever provides a plurality of fore/aft attachment settings for attaching the control lever.

11. The dual lever steering control mechanism of claim 10 wherein the plurality of fore/aft settings in the neutral position lever are slots with detents.

12. The dual lever steering control mechanism of claim 8 wherein the housing, forward/reverse lever and neutral position lever are cast metal.

13. The dual lever steering control mechanism of claim 8 wherein the safety switch is mounted to a landing integral with the housing.

14. The dual lever steering control mechanism of claim 8 further comprising a full speed tracking adjustment bolt in the housing to limit the forward speed of the mower.

15. A dual lever steering control mechanism for mounting a control lever to a mower, comprising:
 - a forward/reverse lever pivotably mounted in a housing between a first end and a second end of the lever; and
 - a neutral position lever mounted to the forward/reverse lever and pivotable to actuate a safety switch attached to the housing; the neutral position lever having a plurality of height and fore/aft settings for attaching the control lever thereto.

16. The dual lever steering control mechanism of claim 15 wherein the forward/reverse lever and neutral position lever are cast metal.

17. The dual lever steering control mechanism of claim 15 wherein the housing includes an upper housing attached to a lower housing.

18. The dual lever steering control mechanism of claim 15 wherein the plurality of height and fore/aft settings include a plurality of slots.

19. The dual lever steering control mechanism of claim 18 wherein the slots have ridges.

20. The dual lever steering control mechanism of claim 15 further comprising a full speed tracking adjustment bolt in the housing.

* * * * *